Nov. 20, 1951
A. F. BISCHOFF
2,575,904
ELECTRIC CHOPPER CIRCUIT
Filed Sept. 16, 1949
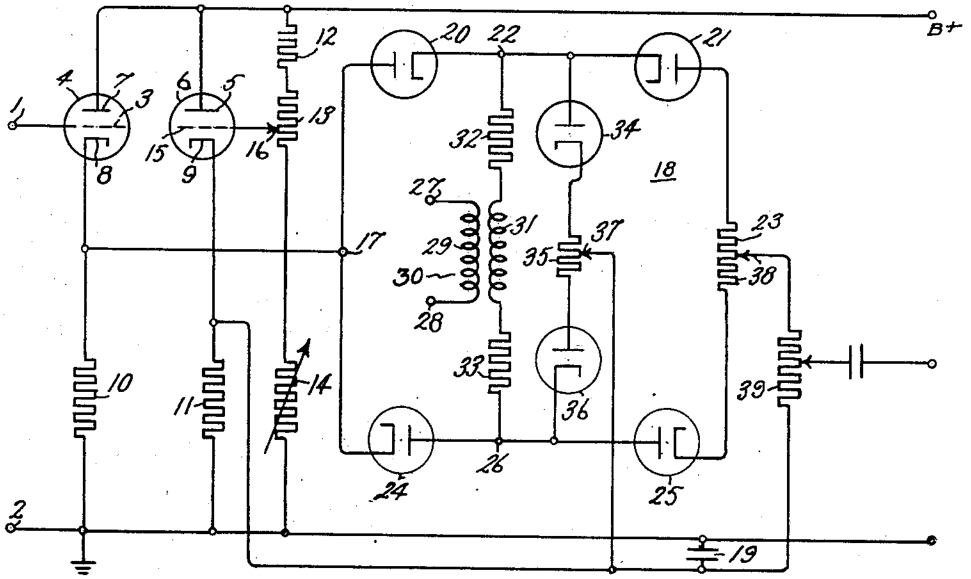
Inventor:
Alfred F. Bischoff,
by Paul A. Frank
His Attorney.

Patented Nov. 20, 1951

2,575,904

UNITED STATES PATENT OFFICE 2,575,904

ELECTRIC CHOPPER CIRCUIT

Alfred F. Bischoff, Ballston Spa, N. Y., assignor to General Electric Company, a corporation of New York Application September 16, 1949, Serial No. 116,197

4 Claims. (Cl. 250—27)

My invention relates to electronic circuits used in converting direct current voltages to equivalent pulsating voltages, such circuits being designated as electronic chopper circuits.

It is difficult to measure accurately small direct current voltages because of the inherent instability of direct current amplifiers. Laboratory methods have been developed to measure small voltages, but where the voltage is varying rapidly or is used for control purposes, these methods are not satisfactory. By converting the direct current voltage to an equivalent pulsating voltage, conventional alternating current amplifiers may be used, thus eliminating the use of the more unstable direct current amplifiers.

In converting a direct current voltage to a pulsating voltage, use has been made of a bridge circuit having a diode in each of its four arms which alternately conducts and blocks the direct current voltage by use of an activating alternating voltage. When all four diodes are conducting, the direct current input signal is effectively connected to the output terminals and a voltage approximately equal to the input voltage appears across the output terminals. When the phase of the activating voltage reverses, the diodes are non-conducting and a very small voltage appears across the output terminals. In this manner, the input terminals are alternately connected to, and disconnected from, the output terminals, thus producing a square wave voltage across the output terminals having the freuqency of the activating voltage and a peak amplitude equal to the direct current input voltage. In the use of this type of circuit, operational difficulties are encountered in particular applications because voltages appear across the output terminals when the input voltage is zero and the difference in conductivity of the diodes causes an unbalance in the output which gives a non-linear characteristic and a high minimum signal with zero input voltage. In addition, during the time the diodes are not conducting, a high noise level exists which appears as an alternating voltage across the output terminals. Furthermore, since the low impedance of the diode bridge loads the input voltage source excessively, a voltage drop appears in the associated impedance of the direct current source and makes the input voltage dependent on the source impedance.

It is an object of my invention to provide an improved electronic chopper circuit of the diode bridge type for converting direct current voltages to equivalent pulsating voltages.

It is an additional object of my invention to provide an electronic chopper circuit having essentially zero output voltage when the input voltage is zero.

It is a further object of my invention to provide an electronic chopper circuit having a low noise level and an increased operational range.

It is a still further object of my invention to provide a high impedance input for the direct current input voltage, thus making the input voltage independent of the impedance of the voltage source.

In carrying out my invention in one form thereof, I provide a high impedance electronic circuit which prevents excessive loading of the voltage source. The input voltage is supplied by the electronic circuit to a four diode bridge circuit including an activating alternating voltage, balancing resistors and a supplementary diode circuit which short-circuits the activating voltage during the non-conducting part of the cycle.

The features of my invention which I believe to be novel are set forth with particularity in the appended claims. My invention itself, however, both as to its organization and method of operation, together with further objects and advantages thereof, may best be understood by reference to the following description taken in connection with the accompanying drawing in which the single figure is a schematic diagram of a high impedance input circuit electrically connected to a four diode bridge circuit constructed in accordance with my invention.

Referring to the drawing, terminals 1 and 2 are connected to a direct current input voltage source (not shown) which supplies a unidirectional voltage to the control electrode 3 of a first electron discharge device 4. An anode 5 of a second electron discharge device 6 is connected to an anode 7 of electron discharge device 4 and cathodes 8 and 9 of devices 4 and 6 are connected to ground through respective cathode resistors 10 and 11. The anodes 5, 7 of devices 8 and 9 are connected to the positive terminal of a direct current electromotive force indicated by the legend B+. Discharge devices 4 and 6 together with their associated cathode resistors 10 and 11 are respectively connected as conventional cathode-follower stages. Fixed resistances 12 and 13 are connected in series with a variable resistance 14 and the series arrangement is connected between the anodes 5 and 7 of devices 4 and 6 and ground. A control electrode 15 of device 6 is connected to resistance 13 through a movable contact 16. By varying the value of variable resistor 14, and the position of movable contact 16 on resistance 13, the potential difference between the cathodes 8 and 9 of devices 4 and 6 may be adjusted to zero when the direct current input voltage is zero.

The cathode 8 of device 4 is connected to a terminal 17 of a four diode bridge circuit 18, and the cathode 9 of device 6 is connected to ground through a capacitor 19. Diodes 20 and 21 in adjacent arms of bridge circuit 18 have their cathodes connected to a common terminal 22, the anode of diode 20 being connected to a bridge input terminal 17 and the anode of diode 21 being connected to one side of a bridge-balancing tapped impedance or potentiometer 23. Similarly, the anodes of diodes 24 and 25 in the remaining arms of bridge circuit 18 are connected to a common terminal 26, the cathode of diode 24 being connected to terminal 17 and the cathode of diode 25 being connected to the other side of potentiometer 23. In order to provide an activating alternating voltage, an oscillator (not shown) is connected to a pair of input terminals 27 and 28 of the primary winding 29 of a keying transformer 30. The secondary winding 31 of the keying transformer 30 is interposed between a pair of balancing resistances 32 and 33, and the series circuit comprising resistance 32, secondary winding 31, and resistance 33 is connected as a diagonal arm of the bridge to the terminals 22 and 26. A fifth diode 34 has its anode connected to the common terminal 22 and its cathode connected to one side of a second bridge balancing tapped impedance or potentiometer 35. A sixth diode 36 has its cathode connected to the common terminal 26 and its anode connected to the remaining side of second potentiometer 35. A movable contact or tap 37 on potentiometer 35 is connected to the ungrounded end of capacitor 19. A movable contact or tap 38 on resistance 23 is connected to an output impedance which may be a third potentiometer 39 connected between between tap 38 and the cathode 9 of discharge device 6.

In operation, a direct current input voltage is supplied to terminals 1 and 2 of a high impedance input circuit which limits the current supplied by the input voltage source and thereby reduces to a minimum the voltage drop in the impedances associated with the input voltage source. Since the voltage supplied to the terminals 1 and 2 is equal to the open circuit voltage of the input source less the voltage drop in the impedance associated therewith, the dependency of the input voltage on the associated impedance of the input voltage source is reduced to a minimum. However, if high voltages are supplied to the electronic chopper circuit, the input voltage may be connected across a high resistance input attenuator and a fractional part of the total input voltage supplied to the control electrode 3 of the electron discharge device 4. Since the voltage supplied to high resistance input attenuator would be independent of the impedance of the voltage source, or nearly so, an increase in the source voltage would be transmitted without loss to the input attenuator and the increased voltage or any fractional part thereof could be transmitted to the control electrode 3 of electron discharge device 4.

The second source of direct current electromotive force indicated as B+, having its negative terminal connected to ground and its positive terminal connected to the anode 7 of the electron discharge device 4, causes a circulating current through device 4 and the cathode resistor 10. The positive terminal of this direct current electromotive force is also connected to the anode 5 of electron discharge device 6, thereby causing a current to pass through device 6 and the cathode resistor 11. The potential supplied to the diode bridge circuit 18 is obtained between the cathodes 8 and 9 of devices 4 and 6. Thus, when the voltage drops in the cathode resistors 10 and 11 are equal in magnitude, the potential difference supplied to the diode bridge is zero.

An increase in input voltage and consequent increase in potential of the control electrode 3 of device 4 increases the current through the cathode resistor 10 and increases the positive potential of the cathode 8 of device 4. The potential of the cathode 9 of device 6 which may be considered a reference-voltage remains constant and, hence, the potential difference between cathodes 8 and 9 of devices 4 and 6 increases with an increase in the input voltage. In order that the voltage output from the chopper circuit may accurately represent the magnitude of the input unidirectional signal voltage, the voltage supplied to the control electrode 15 of device 6 must be adjusted so the potential difference between the cathodes 8 and 9 is zero when the input voltage is zero. To facilitate this adjustment, the series arrangement of fixed resistances 12 and 13 and variable resistance 14 is connected between the terminals of the source of direct current voltage designated B+ and ground. The coarse balance resistor 14 and the movable contact 16 of resistance 13, provide a means for making this adjustment. The voltage of the direct current electromotive force divides across resistances 12, 13, and 14, fixed resistance 12 being of such magnitude that the desired voltage divides across resistors 13 and 14.

The activating alternating voltage appearing across the secondary winding 31 of transformer 30 causes the four diodes 20, 21, 24, 25 alternately to conduct and block the voltage between the cathodes 8 and 9 of devices 4 and 6. When the top end of transformer winding 30 is negative with respect to its lower end, the diodes 20, 21, 24, 25 conduct and with a reversal in polarity of the voltage diodes 20, 21, 24, 25 are non-conducting; thus, for one-half of each cycle of the activating alternating voltage, all four of the aforementioned diodes are conducting, while during the remaining one-half cycle, the same four diodes are non-conducting. When the diodes 20, 21, 24, 25 are non-conducting, the terminals of resistance 39 are effectively disconnected from the potential between the cathodes 8 and 9 of devices 4 and 6, but the inter-electrode capacitance and leakage of diodes 20, 21, 24, 25 conduct a small circulating current during the supposedly non-conducting half of the activating voltage cycle. The interelectrode capacitances form a closed circuit which includes the output resistance 39, the diode bridge circuit 18, and cathode resistors 10 and 11. As a result, the output voltage across resistance 39 is not zero during the non-conducting half of the activating voltage cycle, even though the potential between the cathodes 8 and 9 of devices 4 and 6 is zero.

To eliminate this difficulty, a circuit comprising diodes 34 and 36 and resistance 35 short-circuits the actviating voltage during the non-conducting half of the activating voltage cycle. During this half cycle, the voltage heretofore appearing across the inter-electrode capacitances of the four diodes 20, 21, 24 and 25 now causes the diodes 34 and 36 to conduct, thus eliminating these voltages across the inter-electrode capacitances of the diodes 20, 21, 24 and 25. The potentiometer 35 limits this reverse current, and the voltage drop in diodes 34 and 36 is equalized by adjusting movable contact 37 of potentiometer 35 to have the same potential as terminal 17 and thereby balancing the secondary bridge formed by diodes 20, 24, 34 and 36 to ground. The diodes 34 and 36 also clamp the entire bridge to ground potential by conduction through capacitor 19 during the nonconducting period of diodes 20, 21, 24 and 25 so that any unwanted alternating signal coupled from the primary to the secondary of the transformer, or picked up by stray circuit capacities, including the inter-electrode capacitances of diodes 20, 21, 24 and 25 is conducted to ground and excluded from the output. These diodes 34 and 36 also suppress voltage transients due to the transformer inductance.

When the alternating voltage appearing across the secondary winding 31 of the transformer 30 decreases to a value which is less than twice that required to produce thermionic conduction in diodes 21 and 25, or diodes 20 and 24, the voltage appearing across each diode changes instantaneously and any oscillations which may occur due to the resonant frequency of the secondary winding 31 and its concomitant capacitance are short-circuited through the diode circuit comprising diodes 34 and 36 and potentiometer 35.

To eliminate a voltage output across the resistance 39 when the potential between cathodes 8 and 9 of devices 4 and 6 is zero, the potential difference of terminal 17 and movable contact 38 must be zero. To facilitate this condition, movable contact 38 is adjusted until its potential is equal to the potential of the cathode 9 of device 6, which is the potential of the cathode 8 of device 4 when the input voltage is zero. Under these conditions, the potential difference between terminal 17 and movable contact 38 is zero and current does not flow through the output resistance 39 and the cathode resistors 10 and 11; hence, no output voltage appears across resistance 39.

The movable contact 37 is also adjusted to have the same potential as cathode 9 of device 6. Hence, during the non-conducting portion of the activating voltage cycle, movable contact 37 is at the same potential as movable contact 38. Thus, there is no voltage difference to cause a current flow through the inter-electrode capacitance of the diodes. Resistance 35 also serves to limit the current in diodes 34 and 36 during the non-conducting half of the activating voltage cycle.

While the present invention has been described by reference to a particular embodiment thereof, it will be understood that numerous modifications may be made by those skilled in the art without actually departing from the invention. I, therefore, aim in the appended claims to cover all such equivalent variations as come within the true spirit and scope of the forgoing disclosure.

What I claim as new and desire to secure by Letters Patent of the United States is:

1. An electronic chopper circuit comprising, an input terminal and an output terminal, four diodes each having an anode and a cathode, the cathode of the first of said four diodes being connected to the cathode of the fourth diode and the anode of the second diode being connected to the anode of the third diode, the anode of said first diode and the cathode of said second diode being connected to said input terminal, a first tapped impedance connected between the anode of said fourth diode and the cathode of said third diode, a series circuit comprising a source of alternating potential and current limiting means electrically connected between the cathode of said first diode and the anode of said second diode, a fifth diode having its anode electrically connected to the cathode of said fourth diode and a sixth diode having its cathode electrically connected to the anode of said third diode, and a second tapped impedance connected between the cathode of said fifth diode and the anode of said sixth diode, means for supplying a unidirectional voltage between said input terminal and the tap of said second impedance, and the tap of said first impedance being electrically connected to said output terminal.

2. A circuit for converting unidirectional voltage into an alternating voltage comprising, a pair of cathode follower stages including a pair of electron discharge devices, each having a cathode, a control electrode and an anode and a cathode-resistor connected to the cathode of each device, means for connecting a unidirectional signal voltage to the control electrode of the first of said devices, means for adjusting the potential of the control electrode of the second of said devices so that the difference in potential between the cathode of said first device and said second device is zero when said input voltage is zero, and an electronic chopper circuit coupled between the cathode of said first device and the cathode of said second device and comprising four diodes, each having an anode and a cathode, the cathode of the first of said four diodes being connected to the cathode of the fourth diode and the anode of the second diode being connected to the anode of the third diode, the anode of said first diode and the cathode of said second diode being connected to the cathode of said first device, a first tapped potentiometer connected between the anode of said fourth diode and the cathode of said third diode, a series circuit comprising a source of alternating potential and current limiting means connected between the cathode of said first diode and the anode of said second diode, a fifth diode having its anode electrically connected to the cathode of said fourth diode and a sixth diode having its cathode electrically connected to the anode of said third diode, and a second tapped potentiometer connected between the cathode of said fifth diode and the anode of said sixth diode, the tap of said second potentiometer being electrically connected to the cathode of said second discharge device, and output coupling means including an impedance connected between the tap of said first potentiometer and the cathode of said second discharge device.

3. An electronic chopper circuit comprising, a direct current input terminal and an alternating current output terminal, a bridge circuit connected between said input and output terminals including two pair of diodes connected as balancing arms thereof and a source of alternating voltage as a diagonal arm thereof, each pair of diodes being connected in series conducting relation with respect to said alternating voltage source for alternations of one polarity and in non-conducting relation for alternations of an opposite polarity, a third pair of diodes connected across said alternating voltage source and in series conducting relation therewith during alternations of said opposite polarity only, and means including a potentiometer connected in series between said last mentioned pair of diodes for connection to a reference unidirectional voltage source for adjusting the unidirectional voltage drop across said pair of diodes with respect to a unidirectional signal voltage supplied to said input terminal.

4. A circuit for converting a unidirectional voltage into an alternating voltage comprising, a pair of input terminals, means having a high input impedance connected to said input terminals for producing a voltage representing a unidirectional voltage supplied to said input terminals, a source of constant reference voltage having a magnitude equal to the zero signal magnitude of said representative unidirectional voltage, a bridge circuit connected to receive the voltage difference between said representative unidirectional voltage and said reference voltage, said circuit comprising two pair of diodes each pair connected as balancing arms thereof and a source of alternating voltage connected as a diagonal arm thereof, each pair of diodes being connected in series conducting relation with respect to said alternating voltage source for alternations of one polarity and in nonconducting relation for alternations of an opposite polarity, a third pair of diodes connected across said alternating voltage source and in series conducting relation therewith during alternations of said opposite polarity only, a potentiometer connected in series between said last mentioned pair of diodes and having a movable contact thereof connected to receive said reference voltage, and output voltage coupling means including an impedance connected between said bridge circuit and said reference voltage source.

ALFRED F. BISCHOFF.

REFERENCES CITED

The following references are of record in the file of this patent:

UNITED STATES PATENTS

| Number | Name | Date |
|---|---|---|
| 1,811,319 | Johnson | June 23, 1931 |
| 2,427,688 | Norgaard | Sept. 23, 1947 |
| 2,446,188 | Miller | Aug. 3, 1948 |